United States Patent
Hoshida et al.

(10) Patent No.: US 6,274,690 B1
(45) Date of Patent: Aug. 14, 2001

(54) PREPARATION OF VINYL CHLORIDE POLYMER

(75) Inventors: Shigehiro Hoshida; Tatsuo Ishii; Genji Noguki, all of Ibaraki-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 09/636,745

(22) Filed: Aug. 11, 2000

(30) Foreign Application Priority Data

Aug. 11, 1999 (JP) .................................................. 11-227321

(51) Int. Cl.[7] ...................................................... C08F 14/06
(52) U.S. Cl. ............................ 526/344; 526/62; 526/344.2
(58) Field of Search ..................................... 526/62, 344.2, 526/344

(56) References Cited

U.S. PATENT DOCUMENTS 4,374,966 * 2/1983 Fischer et al. ........................ 526/62

* cited by examiner

Primary Examiner—David W. Wu
Assistant Examiner—William Cheung
(74) Attorney, Agent, or Firm—Birch, Stewart, Kolasch & Birch

(57) ABSTRACT

A vinyl chloride polymer is prepared by charging a reactor with a vinyl chloride monomer, effecting polymerization, removing a slurry of the polymer from the reactor, and washing the reactor interior with water, and repeating the series of steps. The reactor has an internal volume of at least 40 m$^3$. A cylinder-guided lift type washer assembly having a nozzle is secured to the reactor at its top in a sealed manner such that the nozzle can be moved downward and upward in the reactor. Water is fed to the nozzle through the assembly for injecting water from the nozzle into the reactor for cleaning. The large size reactor can be effectively washed with water in the closed state, and vinyl chloride polymers of quality with least fisheyes are produced batchwise, leading to an improved productivity.

7 Claims, 3 Drawing Sheets

PREPARATION OF VINYL CHLORIDE POLYMER

This invention relates to a process for preparing a vinyl chloride polymer in a reactor and more particularly, to a process for preparing a vinyl chloride polymer of quality with minimal fisheyes batchwise in a closed large size reactor.

BACKGROUND OF THE INVENTION

In the prior art process for preparing a vinyl chloride polymer batchwise in a reactor, a polymer slurry is discharged from the reactor at the end of polymerization. Since a polymer scale has built up on the reactor inner wall, the reactor must then be cleaned for subsequent reaction. The following cleaning steps were used in the prior art.

(1) After the reactor is opened by disconnecting a manhole lid, pressurized water (water pressure 150 kg/cm$^2$G= 14.8 MPa·Gauge or higher) is injected through the manhole to wash away the polymer scale.

(2) After the reactor is opened by disconnecting a manhole lid, the worker enters the reactor and manually removes the polymer scale.

These cleaning steps (1) and (2) are performed while keeping the reactor open. This allows the unreacted monomer left in the reactor, though in a minor amount, to escape to the ambient air, causing air pollution. At the end of cleaning, the manhole must be closed again. A substantial labor and time are needed for opening and closing the manhole. The cleaning step deprives the process of continuity, leading to a lower productivity.

To solve these problems, the following cleaning steps were proposed.

(3) A nozzle is fixedly attached to the reactor at its top whereby pressurized water (water pressure 150 kg/cm$^2$G =14.8 MPa·Gauge or higher) is injected from the nozzle into the reactor for cleaning while keeping the reactor closed without substantial opening.

(4) A special solvent is poured into the reactor for cleaning while keeping the reactor closed without substantial opening.

Currently, large size polymerization reactors having an internal volume of greater than about 40 m$^3$ are often used for the purpose of improving productivity. When the cleaning steps (3) and (4) are applied to such large size reactors, it is difficult from the apparatus and economical standpoints to fully clean the large size reactor in a closed state without substantially opening it. It is also difficult to solve the quality problem of vinyl chloride polymer products containing many fisheyes.

SUMMARY OF THE INVENTION

An object of the invention is to provide a novel and improved process for preparing a vinyl chloride polymer of quality with minimal fisheyes batchwise in a closed large size reactor, the process including washing the reactor with water without substantially opening the reactor.

It has been found that by providing a reactor at its top with a cylinder-guided lift type washer assembly having a vertically movable nozzle and injecting water into the reactor through the nozzle for cleaning the reactor, even a large size reactor having an internal volume of at least 40 m$^3$ can be effectively cleaned in a closed state, ensuring that vinyl chloride polymers of quality with least fisheyes are produced.

In one embodiment, the invention provides a process for preparing a vinyl chloride polymer by charging a reactor with a vinyl chloride monomer alone or a mixture of a vinyl chloride monomer and a monomer copolymerizable therewith, effecting polymerization to form a polymer, removing a slurry of the polymer from the reactor, and washing the interior of the reactor with water, and repeating a series of the foregoing steps. The reactor has an internal volume of at least 40 m$^3$. A cylinder-guided lift type washer assembly having a nozzle is secured to the reactor at its top in a sealed manner such that the nozzle can be moved downward and upward in the reactor. The washing step is effected by feeding water to the nozzle through the assembly for injecting water from the nozzle into the reactor. Preferably, the nozzle is moved downward and then upward over a stoke of at least 1 meter. The reactor is preferably kept under an internal pressure of 0 to 7 kg/cm$^2$G (0.101 to 0.788 MPa·Gauge) during the washing step. According to the invention, the large size reactor can be washed with water in the closed state, eliminating the potential of air pollution and significantly improving workability and productivity. The cylinder-guided lift type washer assembly having a vertically movable nozzle exerts an excellent cleaning effect. As a consequence, vinyl chloride polymers of quality with least fisheyes are effectively produced batchwise.

DESCRIPTION OF THE PREFERRED EMBODIMENT

The process for preparing a vinyl chloride polymer according to the invention involves the steps of charging a reactor with a vinyl chloride monomer alone or a mixture of a vinyl chloride monomer and a copolymerizable monomer, effecting polymerization to form a polymer, removing a slurry of the polymer from the reactor, and washing the interior of the reactor with water, and repeating the series of steps. The reactor has an internal volume of at least 40 m$^3$. A cylinder-guided lift type washer assembly having a nozzle is secured to the reactor at its top in a sealed manner such that the nozzle can be moved downward and upward in the reactor.

The reactor used in the process is a large size polymerization kettle having an internal volume of at least 40 m$^3$, and preferably at least 80 m$^3$. The reactor is provided at its top with a cylinder-guided lift type washer assembly having a nozzle in a sealed manner.

Figure 1:
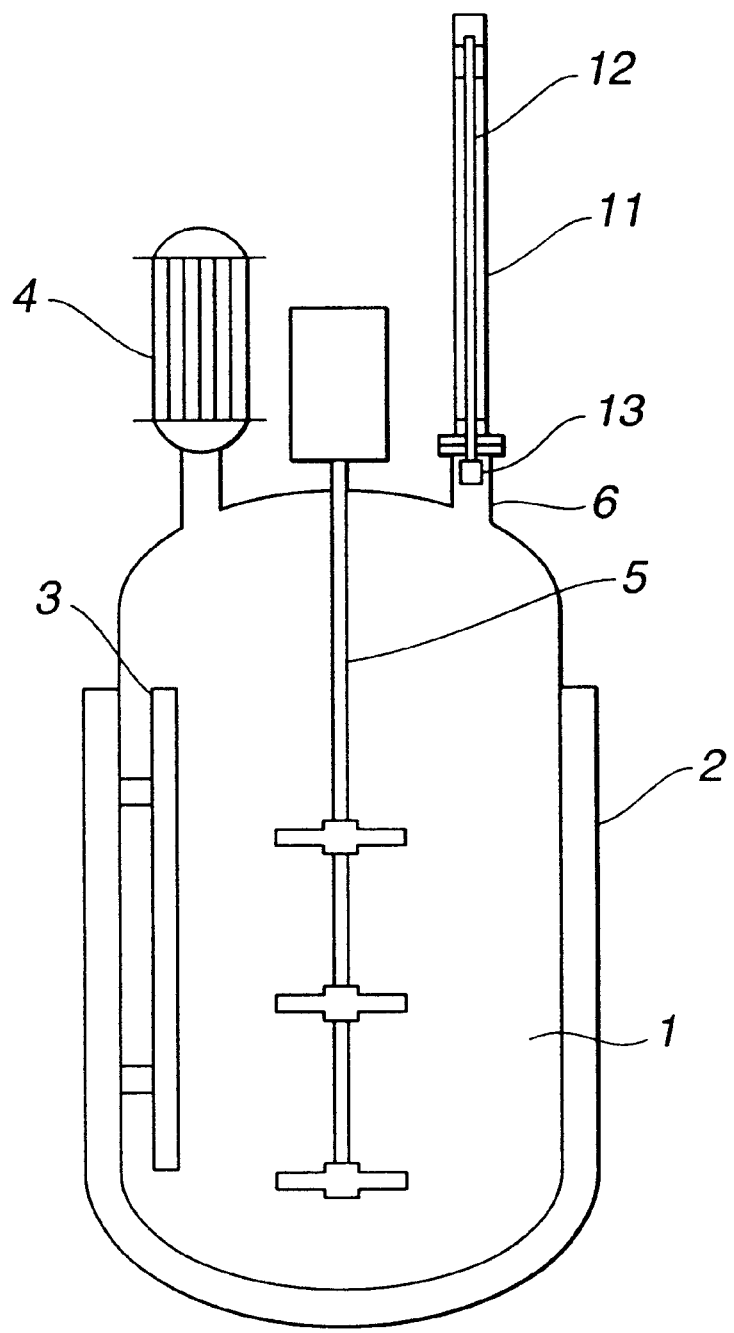
FIG. 1 is a schematic cross-sectional view of one exemplary polymerization reactor equipped with a cylinder-guided lift type washer assembly having a movable nozzle according to the invention.

Referring to FIG. 1, there is illustrated one exemplary reactor having a cylinder-guided lift type washer assembly. The illustrated reactor includes a generally cylindrical kettle 1 equipped with an external jacket 2, a baffle 3, a reflux condenser 4, and an agitator 5. A cylinder-guided lift type washer assembly 10 is air-tightly secured to the top of the reactor 1 through a stand pipe 6. The washer assembly 10 includes a vertically standing cylinder 11 having an axis, a feed water metal pipe 12 disposed in the cylinder 11 for axial or vertical motion by a suitable drive (not shown), and a nozzle 13 attached to the distal or lower end of the feed pipe 12. Briefly stated, the feed pipe 12 is moved downward for moving the nozzle 13 into the reactor 1, and water is fed through the feed pipe 12 whereby water is injected and sprayed from the nozzle 13 into the reactor 1 for washing the inner wall of the reactor 1 with water. It is noted that the reactor and the cylinder-guided lift type washer assembly attached thereto are not limited to those illustrated in FIG. 1. An inlet for the reactants and an outlet for the polymer slurry are omitted in the figure merely for brevity of illustration.

The provision of the reactor at its top with a cylinder-guided lift type washer assembly-in a sealed manner means that the reactor interior can be washed with water in a closed state without substantially opening the reactor. That is, the cylinder-guided lift type washer assembly is coupled to the reactor in a sealed manner so that during the washing step, the unreacted vinyl chloride monomer and other components remaining in the reactor may not escape to the ambient.

The manner of coupling the cylinder-guided lift type washer assembly to the reactor is not critical as long as a seal is established therebetween. Coupling may be achieved by welding or bolting a flange with a gasket interposed. Indirect coupling using a valve disposed between the reactor and the cylinder is also acceptable.

The cylinder-guided lift type washer assembly generally includes a vertically extending cylinder and a feed water metal pipe which is disposed in the cylinder for vertical motion. As the feed pipe is moved down through the cylinder, the distal or lower end of the feed pipe is projected from the lower end of the cylinder into the reactor. A nozzle is attached to the lower end of the feed pipe for injecting wash water.

After the nozzle has entered the reactor, the feed pipe is vertically moved further downward and then upward. Simultaneously, the nozzle at the lower end of the feed pipe is vertically moved downward and then upward within the reactor. The downward and subsequent upward movement of the feed pipe or nozzle is designated a stroke.

Means for driving the feed pipe for vertical motion include an electric motor, hydraulic jet cylinder, hydraulic cylinder, pneumatic cylinder and oil cylinder, with the hydraulic drives such as the hydraulic jet cylinder and hydraulic cylinder being preferred. Multi-stage cylinder mechanisms having a plurality of telescopic cylinders wherein the cylinders may be slidingly extended are also employable, with the mechanisms having 1 to 5 cylinders being economically advantageous. The number of nozzles in the washer assembly is not limited to one.

Attached to the distal end of the feed pipe is the nozzle for injecting wash water. The nozzle may be either stationary or rotary. The rotating nozzle is advantageous from the standpoints of cleaning effect and efficiency. Of the rotating nozzles, a three-dimensional rotating nozzle is preferred for achieving a satisfactory cleaning effect, and a low-pressure rotating nozzle is also preferred.

According to the invention, the reactor is provided at its top with the cylinder-guided lift type washer assembly in a sealed manner as mentioned above. Preferably the nozzle is attached to the distal end of the feed pipe such that at the upper limit of the stroke, the nozzle is located at the highest position outside the reactor or in a gas phase region H within the reactor that extends from the top A to an upper boundary B in FIG. 2. Preferably, at the upper limit of the stroke, the nozzle at the distal end of the feed pipe is located at the highest or home position outside the reactor.

Figure 2:
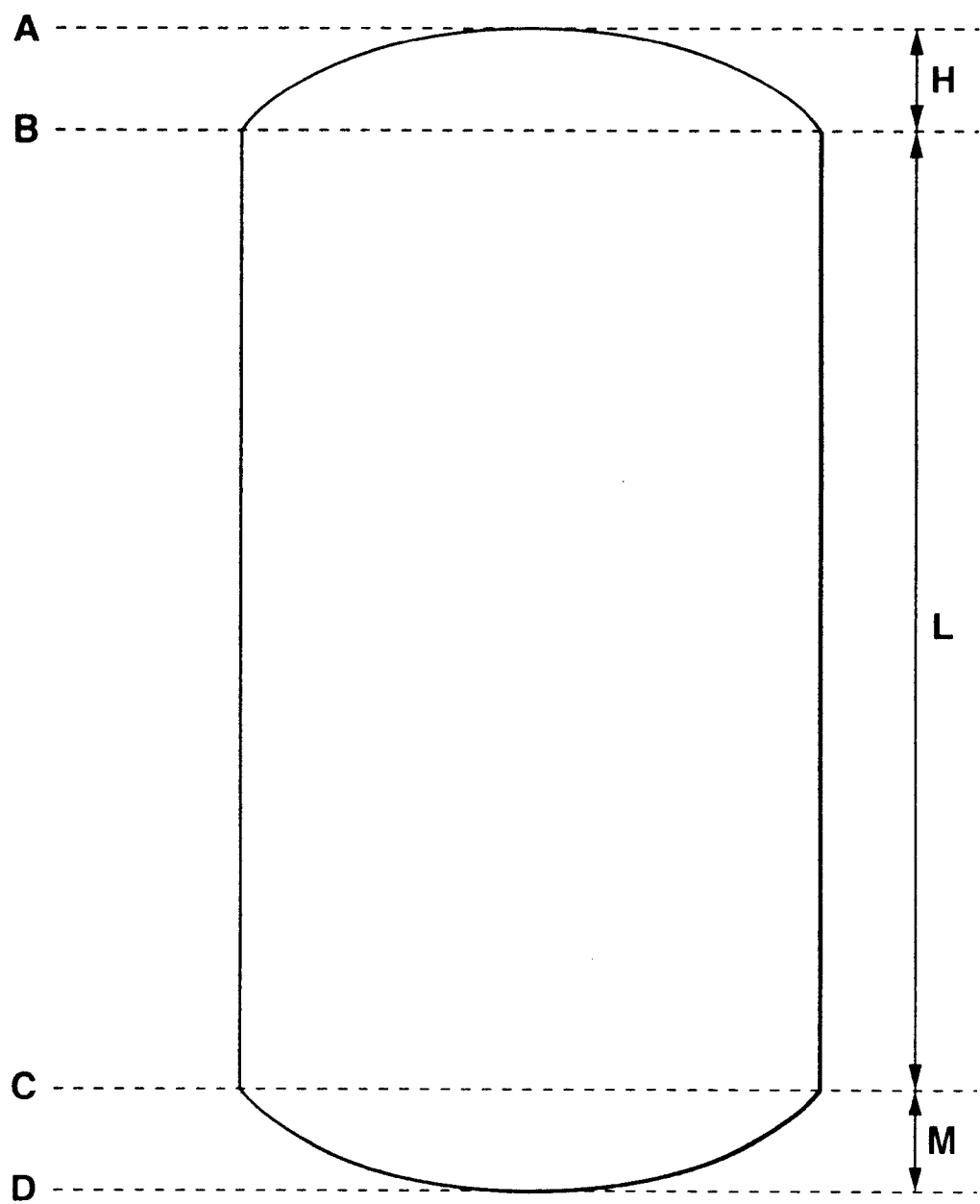
FIG. 2 schematically illustrates another exemplary reactor.

Also preferably, at the lower limit of the stroke, the nozzle is located at the lowest position near or above a lower boundary C between a bottom region M and a barrel region L of the reactor in FIG. 2.

By driving the feed pipe for vertical motion through the cylinder, the nozzle at the lower end of the feed pipe is moved into the reactor and further downward in the reactor while injecting wash water therefrom. Specifically, the nozzle is moved past the upper boundary B between the gas phase region H and the barrel region L of the reactor and further downward through the barrel region L as shown in FIG. 2. Once the nozzle is advanced to the lowest position near or above the lower boundary C, the drive is reversed to move the feed pipe and the nozzle upward. While the nozzle is moved down and up one stroke, wash water is continuously injected from the nozzle. When the nozzle is returned to the home position, water feed is stopped.

It is important that the nozzle of the cylinder-guided lift type washer assembly is vertically moved from above the reactor, past the upper boundary B between the gas phase region H and the barrel region L of the reactor, and into the barrel region L.

Since the invention necessarily uses a large size reactor having an internal volume of at least 40 cubic meter, the nozzle of the cylinder-guided lift type washer assembly should preferably be moved a stroke of at least 1 meter, and more preferably at least 2 meters, in order to accomplish full cleaning of the reactor interior with water.

In the step of washing the reactor interior with water according to the invention, the water pressure is not critical. The use of the cylinder-guided lift type washer assembly eliminates a need for high pressure water (water pressure 150 to 600 kg/cm$^2$G=14.8 to 58.86 MPa·Gauge or higher) used in the prior art. The wash water is preferably fed under a pressure of 1 to 50 kg/cm$^2$G (0.0981 to 4.91 MPa·Gauge), more preferably 1 to 40 kg/cm$^2$G (0.0981 to 3.92 MPa·Gauge), and most preferably 1 to 25 kg/cm$^2$G (0.0981 to 2.45 MPa·Gauge).

Even when the pressure of wash water is less than 1 kg/cm$^2$G (0.0981 MPa·Gauge), it is possible to wash the residual polymer in the reactor and the polymer scale on the reactor inner wall away from the reactor, but a longer time is needed for washing, resulting in a low production efficiency. On the other hand, a wash water pressure in excess of 50 kg/cm$^2$G (4.91 MPa·Gauge) requires a special pump for boosting the water pressure and a complex means for controlling the water pressure so that the overall water washing system becomes expensive to manufacture and operate. A water pressure of 1 kg/cm$^2$G (0.0981 MPa·Gauge) or higher is recommended because of a shorter washing time as well as the effect of reducing fisheyes.

In the water washing step, the reactor is preferably kept under an internal pressure of 0 to 7 kg/cm$^2$G (0.101 to 0.788 MPa·Gauge). Since the spray pattern of wash water injected from the nozzle of the cylinder-guided lift type wash assembly varies with the water pressure, an internal pressure of less than 0 kg/cm$^2$G (0.101 MPa·Gauge) or more than 7 kg/cm$^2$G (0.788 MPa·Gauge) may affect the cleaning effect and hence, the effect of reducing fisheyes in vinyl chloride polymer products.

While using a large size reactor having an internal volume of at least 40 m$^3$, and especially at least 80 m$^3$, the process of the invention is effective for cleaning the reactor in the closed state without substantially opening the reactor and hence, for reducing fisheyes in vinyl chloride polymer products. Since a need for opening the reactor during the washing step is eliminated, the concern about air pollution or a need for opening and closing a manhole is eliminated. A significant improvement in productivity is thus expected.

The process for preparing a vinyl chloride polymer according to the invention involves the steps of charging a reactor with a vinyl chloride monomer, effecting polymerization to form a polymer, removing a slurry of the polymer from the reactor at the end of polymerization, and washing the reactor with water. By repeating a series of the steps, a vinyl chloride polymer is produced batchwise in an efficient manner.

In the practice of the invention, there may be used in combination any of conventional techniques for preventing polymer scale deposition, for example, by coating a polymer scale anti-stick agent to the reactor inner wall or adding a polymer scale anti-stick agent to the polymerization reaction system. The combined use of such an anti-stick technique reduces the amount of polymer scale build-up to be removed or cleaned, achieving a further reduction of the washing time and hence, a further improvement in productivity.

The vinyl chloride polymer preparing process of the invention is not particularly limited with respect to the polymerization mode although polymerization in an aqueous medium is preferable. The polymerization mode in an aqueous medium includes suspension polymerization, micro-suspension polymerization and emulsion polymerization, but not limited thereto. The suspension polymerization is preferred.

The vinyl chloride polymers prepared by the process of the invention include vinyl chloride homopolymers and copolymers of a vinyl chloride monomer with another monomer copolymerizable therewith, preferably containing at least 50% by weight of vinyl chloride.

Examples of the monomer copolymerizable with vinyl chloride include olefins such as ethylene and propylene; vinyl esters such as vinyl acetate, vinyl propionate, and vinyl stearate; (meth)acrylates such as methyl acrylate, ethyl acrylate, and methyl methacrylate; esters of acids such as maleic acid and fumaric acid; nitrile compounds such as acrylonitrile; vinylidene compounds such as vinylidene chloride; styrene; and other copolymerizable monomers. These monomers may be used alone or in admixture.

A polymerization initiator is used in effecting polymerization. It is selected from oil and water soluble initiators commonly used in the polymerization of vinyl chloride monomers though not limited thereto. Examples of the oil-soluble initiator include organic peroxides such as lauroyl peroxide, 3,5,5-trimethylhexanoyl peroxide, t-butyl peroxypivalate, t-butyl peroxyneodecanate, diisopropyl peroxydicarbonate, di-2-ethylhexyl peroxydicarbonate, and acetylcyclohexylsulfonyl peroxide; and azo compounds such as $\alpha,\alpha'$-azobisisobutyronitrile and $\alpha,\alpha'$-azobis-2,4-dimethylvaleronitrile, which may be used alone or in combination of two or more.

Examples of the water-soluble initiator include ammonium persulfate, potassium persulfate, and hydrogen peroxide, which may be used alone or in combination of two or more depending on a particular polymerization mode.

The polymerization initiator is generally used in an amount of about 0.01 to 3 parts by weight per 100 parts by weight of the monomer charge.

A dispersant is often used in suspension polymerization. Well-known dispersants are useful, for example, partially saponified polyvinyl alcohol, methyl cellulose, hydroxypropyl cellulose, polyethylene oxide, gelatin, vinyl acetate-maleic anhydride copolymers, styrene-maleic anhydride copolymers, and starch. These dispersants may be used alone or in admixture of two or more. For micro-suspension polymerization and emulsion polymerization, an emulsifier is often used. Well-known emulsifiers are useful, for example, anionic surfactants such as sodium alkyl sulfates, sodium alkylbenzenesulfonates, sodium $\alpha$ olefinsulfonates, and sodium fatty acid; and nonionic surfactants such as polyoxyethylene alkyl ethers, polyoxyethylene alkyl phenol ethers, and sorbitan fatty acid esters. These emulsifiers may be used alone or in admixture of two or more.

The dispersant or emulsifier is generally used in an amount of about 0.01 to 3 parts by weight per 100 parts by weight of the monomer charge.

In the practice of the invention, a molecular weight adjusting agent, chain transfer agent, pH adjusting agent, gel modifier, antistatic agent or the like may be used if necessary. The polymerization initiator, dispersant, emulsifier, molecular weight adjusting agent and other agents used in polymerization reaction may be initially added together to the polymerization reaction system or added in divided portions during polymerization reaction. The remaining polymerization conditions may be selected from commonly used conditions, depending on a particular monomer type and polymerization mode.

EXAMPLE

Examples of the invention are given below by way of illustration and not by way of limitation.

Examples 1–7

There was furnished a stainless steel polymerization reactor having an internal volume of 80 m$^3$ equipped with a reflux condenser, outer jacket, baffle and agitator. As shown in FIG. 1, the reactor was further equipped at the top in a sealed manner with a cylinder-guided lift type washer assembly having a vertically movable feed water metal pipe and a nozzle at the distal end thereof. The nozzle was initially located at the home position outside the reactor. The nozzle was a low-pressure, three-dimensionally rotating nozzle. The drive power for moving up and down the feed pipe and the drive power for rotating the nozzle were produced by hydraulic water drives. Using the reactor, a vinyl chloride polymer was prepared as follows.

After deaeration, the reactor was charged with 40 m$^3$ of deionized water, 30 kg of partially saponified polyvinyl alcohol, 15 kg of di-2-ethylhexyl peroxydicarbonate, and 30 tons of vinyl chloride monomer. With stirring, polymerization was initiated by heating at 57° C. Polymerization was continued while maintaining an internal temperature of 57° C.

Polymerization was terminated when the rate of polymerization reached 85%. The slurry of vinyl chloride polymer in water was removed from the reactor. Thereafter, the interior of the reactor was washed with water under the conditions shown in Table 1.

In succession, the second and subsequent batches were performed by charging, effecting polymerization, removing the polymer slurry, and water washing under the same conditions as above. In this way, the preparation of vinyl chloride polymer (PVC) was repeated until 50 continuous batches were completed.

The polymer slurry samples from the 25th and 50th batches were dewatered and dried to give vinyl chloride polymer samples, which were examined for fisheyes by the following test. The results are shown in Table 1.

Comparative Example 1

Figure 3:
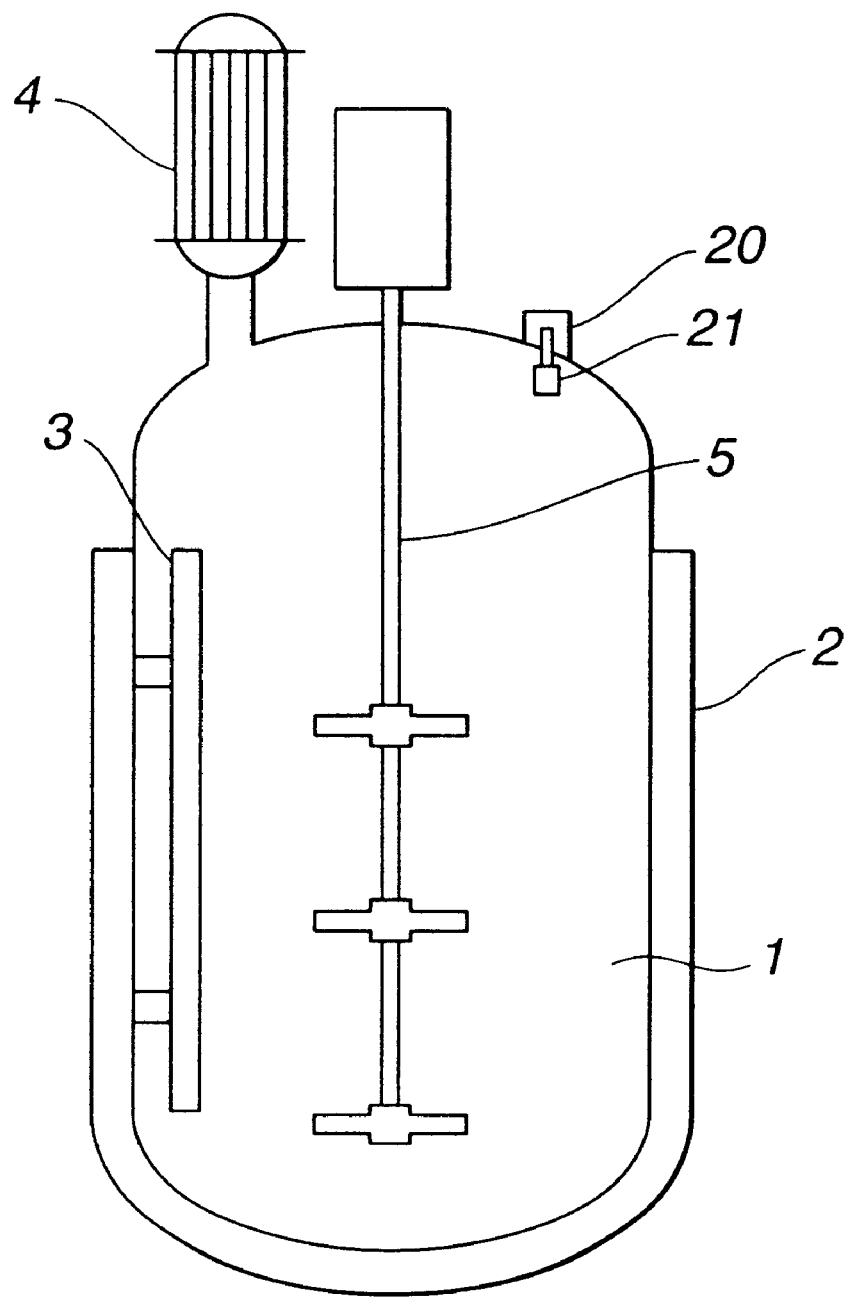
FIG. 3 is a schematic cross-sectional view of a polymerization reactor equipped with a fixed nozzle washer assembly used in Comparative Examples.

Polymerization was performed as in Examples 1 to 7 except that instead of the cylinder-guided lift type washer assembly, the reactor was provided at the top with a washer assembly 20 having a rotating nozzle 21 as shown in FIG. 3. The rotating nozzle 21 was a high-pressure, three-dimensionally rotating nozzle and could not be vertically moved.

The polymer slurry samples from the 25th and 50th batches were dewatered and dried to give vinyl chloride polymer samples, which were examined for fisheyes. The results are shown in Table 1.

Comparative Example 2

Polymerization was performed as in Examples 1 to 7 except that instead of the cylinder-guided lift type washer assembly, the reactor was provided at the top with a washer assembly 20 having a rotating nozzle 21 as shown in FIG. 3. The rotating nozzle 21 was a low-pressure, three-dimensionally rotating nozzle and could not be vertically moved.

The polymer slurry samples from the 25th and 50th batches were dewatered and dried to give vinyl chloride polymer samples, which were examined for fisheyes. The results are shown in Table 1.

Fisheye test

Using a 6-inch roll mill, 100 parts of the vinyl chloride polymer (PVC), 50 parts of dioctyl phthalate (DOP), 0.1 part of barium stearate, 0.1 part of cadmium stearate, 0.8 part of cetanol, 2.0 parts of a tin stabilizer, 0.5 part of titanium dioxide, and 0.1 part of carbon black, all in part by weight, were milled at 140° C. for 4 minutes. The mass was sheeted into a sheet of 0.3 mm thick. The number of white clear particles per 100 cm$^2$ of the sheet was counted.

It is evident from Table 1 that Examples 1 to 7 using a cylinder-guided lift type washer assembly with a vertically movable nozzle yielded vinyl chloride polymers containing less fisheyes because of effective cleaning as compared with Comparative Examples 1 and 2 using a washer assembly with a fixed nozzle.

While using a large size reactor having an internal volume of at least 40 m$^3$, the process of the invention enables to effectively clean the reactor in the closed state without substantially opening the reactor. The process of the invention can produce a vinyl chloride polymer with few fisheyes. Since effective water washing is accomplished without a need for opening the reactor, a significant improvement in productivity is made.

Japanese Patent Application No. 11-227321 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A process for preparing a vinyl chloride polymer, comprising the steps of providing a reactor having an internal volume of at least 40 m$^3$ and a cylinder-guided lift type washer assembly with a nozzle movable downward and upward in the reactor, said assembly being secured to the reactor at its top in a sealed manner, charging said reactor with water, and with a vinyl chloride monomer alone or with a mixture of a vinyl chloride monomer and a monomer copolymerizable therewith, to form an aqueous medium, effecting polymerization in said aqueous medium to form a polymer, removing a slurry of the polymer from the rector,

TABLE 1

| | Example | | | | | | | Comparative Example | |
|---|---|---|---|---|---|---|---|---|---|
| | 1 | 2 | 3 | 4 | 5 | 6 | 7 | 1 | 2 |
| Internal pressure of reactor during washing | | | | | | | | | |
| (kg/cm$^2$G) | 0.1 | 1 | 3 | 3 | 3 | 6 | 9 | 3 | 3 |
| (MPa · Gauge) | 0.0098 | 0.0981 | 0.2943 | 0.2943 | 0.2943 | 0.5886 | 0.8829 | 0.2943 | 0.2943 |
| Up/down stroke of feed pipe (m) | 4 | 4 | 2 | 4 | 6 | 4 | 4 | 0 | 0 |
| Lowest position of nozzle | deep | deep | deep | deep | deep | deep | deep | top | top |
| Water pressure | | | | | | | | | |
| (kg/cm$^2$G) | 15 | 15 | 15 | 15 | 15 | 15 | 15 | 200 | 15 |
| (MPa · Gauge) | 1.472 | 1.472 | 1.472 | 1.472 | 1.472 | 1.472 | 1.472 | 19.62 | 1.472 |
| Fisheyes in 25th batch PVC (/100 cm$^2$) | 5 | 5 | 6 | 4 | 4 | 8 | 11 | 25 | 26 |
| Fisheyes in 50th batch PVC (/100 cm$^2$) | 4 | 5 | 7 | 6 | 4 | 9 | 12 | 31 | 24 |

Note: that the lowest position of the nozzle is designated "deep" when the nozzle is moved deeply in the barrel region L of the reactor between the upper and lower boundaries B and C in FIG. 2 and "top" when the nozzle is not moved downward past the upper boundary B.

washing the interior of the reactor with water by feeding water to the nozzle through the assembly and injecting said water from the nozzle into the reactor while moving the nozzle downward and then upward over a stroke of at least 1 meter, and repeating the charging, polymerization, polymer removal, and washing steps.

2. The process of claim 1, wherein the reactor is maintained at an internal pressure of 0 to 7 kg/cm$^2$G (0.101 to 0.0788 MPa·Gauge) during the washing step.

3. The process of claim 1, wherein the nozzle is moved downward and then upward at least twice.

4. The process of claim 1, wherein the vinyl chloride polymer produced has no more than 12 fisheyes per 100 cm$^2$.

5. The process of claim 1, wherein the wash water is fed under a pressure of 1 to 50 kg/cm$^2$G.

6. The process of claim 5, wherein the wash water is fed under a pressure of 1 to 40 kg/cm$^2$G.

7. The process of claim 6, wherein the wash water is fed under a pressure of 1 to 25 kg/cm$^2$G.

* * * * *